United States Patent
Gao et al.

(10) Patent No.: US 11,539,493 B2
(45) Date of Patent: Dec. 27, 2022

(54) HARQ-ACK TRANSMISSION METHOD, USER EQUIPMENT, AND NETWORK SIDE DEVICE

(71) Applicant: DATANG MOBILE COMMUNICATIONS EQUIPMENT CO., LTD., Beijing (CN)

(72) Inventors: Xuejuan Gao, Beijing (CN); Yanping Xing, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 17/607,384

(22) PCT Filed: Apr. 26, 2020

(86) PCT No.: PCT/CN2020/086968
§ 371 (c)(1),
(2) Date: Oct. 28, 2021

(87) PCT Pub. No.: WO2020/221150
PCT Pub. Date: Nov. 5, 2020

(65) Prior Publication Data
US 2022/0209923 A1  Jun. 30, 2022

(30) Foreign Application Priority Data
Apr. 30, 2019  (CN) .......................... 201910365174.0

(51) Int. Cl.
*H04L 5/00* (2006.01)
*H04L 1/18* (2006.01)
*H04W 72/12* (2009.01)

(52) U.S. Cl.
CPC .......... *H04L 5/0055* (2013.01); *H04L 1/1812* (2013.01); *H04W 72/1284* (2013.01); *H04W 72/1289* (2013.01)

(58) Field of Classification Search
CPC combination set(s) only.
See application file for complete search history.

(56) References Cited

U.S. PATENT DOCUMENTS

| 2015/0230242 A1 | 8/2015 | Papasakellariou et al. |
| 2016/0212734 A1 | 7/2016 | He et al. |
| (Continued) | | |

FOREIGN PATENT DOCUMENTS

| CN | 102223219 A | 10/2011 |
| CN | 103516487 A | 1/2014 |
| (Continued) | | |

OTHER PUBLICATIONS

International Search Report and Written Opinion issued for International Application No. PCT/CN2020/086968 dated Jul. 21, 2020, with translation provided by patentscope, entire document.

(Continued)

*Primary Examiner* — Hanh N Nguyen
(74) *Attorney, Agent, or Firm* — Ladas & Parry, LLP

(57) ABSTRACT

A HARQ-ACK transmission method, a user equipment, and a network device are provided. The method performed by the user equipment includes: determining a target PUSCH for carrying HARQ-ACK when a PUCCH carrying HARQ-ACK overlaps with at least one PUSCH in time domain; obtaining an indication field of a DAI in a DCI scheduling a second type of PUSCH, when the target PUSCH is a first type of PUSCH; determining, according to the obtained indication field of the DAI, the number of bits of HARQ-ACK transmitted in the target PUSCH, and transmitting HARQ-ACK in the target PUSCH according to the deter- (Continued)

Determining a target Physical Uplink Shared Channel (PUSCH) for carrying the HARQ-ACK, when a Physical Uplink Control Channel (PUCCH) carrying the HARQ-ACK overlaps with a PUSCH in time domain — 101

Obtaining an indication field of a Downlink Allocation Index (DAI) in a Downlink Control Information (DCI) scheduling a second type of PUSCH, when the target PUSCH is a first type of PUSCH — 102

Determining, according to the obtained indication field of the DAI, the number of bits of the HARQ-ACK transmitted in the target PUSCH, and transmitting the HARQ-ACK in the target PUSCH according to the determined number of bits of the HARQ-ACK — 103 mined number of bits of HARQ-ACK, wherein the first type of PUSCH is a PUSCH with a DCI scheduling or a PUSCH scheduled by a DCI without DAI, the second type of PUSCH is a PUSCH scheduled by a DCI with a DAI.

20 Claims, 5 Drawing Sheets

(56) References Cited

U.S. PATENT DOCUMENTS

| | | |
|---|---|---|
| 2016/0337089 A1 | 11/2016 | Chen et al. |
| 2018/0077698 A1 | 3/2018 | Takeda et al. |
| 2018/0145814 A1 | 5/2018 | Liu et al. |
| 2018/0206263 A1 | 7/2018 | Lin |
| 2019/0044649 A1 | 2/2019 | Kim et al. |
| 2019/0104565 A1 | 4/2019 | Park |
| 2019/0320431 A1* | 10/2019 | Huang .................. H04L 5/0053 |
| 2019/0349942 A1 | 11/2019 | Li et al. |
| 2020/0037255 A1 | 1/2020 | Liu et al. |
| 2020/0120682 A1 | 4/2020 | Li et al. |
| 2020/0178263 A1 | 6/2020 | Shao |
| 2020/0280397 A1 | 9/2020 | Gao |
| 2020/0367265 A1* | 11/2020 | Wang .................... H04W 76/27 |
| 2020/0374867 A1* | 11/2020 | Du ........................ H04L 1/1812 |
| 2020/0403735 A1 | 12/2020 | Zhao |
| 2021/0144702 A1* | 5/2021 | Zhao .................. H04W 72/1268 |
| 2021/0266936 A1* | 8/2021 | Gao ...................... H04L 1/1671 |

FOREIGN PATENT DOCUMENTS

| | | |
|---|---|---|
| CN | 104426637 A | 3/2015 |
| CN | 104767595 A | 7/2015 |
| CN | 105846977 A | 8/2016 |
| CN | 107294665 A | 10/2017 |
| CN | 107371184 A | 11/2017 |
| CN | 108024345 A | 5/2018 |
| CN | 108271262 A | 7/2018 |
| CN | 108307518 A | 7/2018 |
| CN | 108632966 A | 10/2018 |
| CN | 109150424 A | 1/2019 |
| CN | 109155726 A | 1/2019 |
| CN | 109391459 A | 2/2019 |
| CN | 109392126 A | 2/2019 |
| CN | 109474391 A | 3/2019 |
| CN | 109644466 A | 4/2019 |
| WO | WO 2018203686 A1 | 11/2018 |

OTHER PUBLICATIONS

International Preliminary Report on Patentability issued for International Application No. PCT/CN2020/086968 dated Nov. 2, 2021, with translation provided by patentscope, entire document.
Office Action issued forCN Application No. 201910365174.0 dated Mar. 23, 2021, with translation provided by Espacenet global dossier, entire document.
Extended European Search Report for European Patent Application No. 20798588.8 dated May 23, 2022.
"Remaining Issues on HARQ-ACK multiplexing," 3GPP TSG RAN WG1 Meeting #94bis, R1-1811451, Chengdu, China, Oct. 8-12, 2018, Source: WILUS Inc., Agenda item: 7.1.3.4, all pages.
"Correction on PUSCH selection for overlapping of PUCCH and PUSCH," 3GPP TSG-RAN WG1 Meeting #96bis, R1-1904538, Xi'an, China, Apr. 8-12, 2019, Source: CATT, all pages.

* cited by examiner

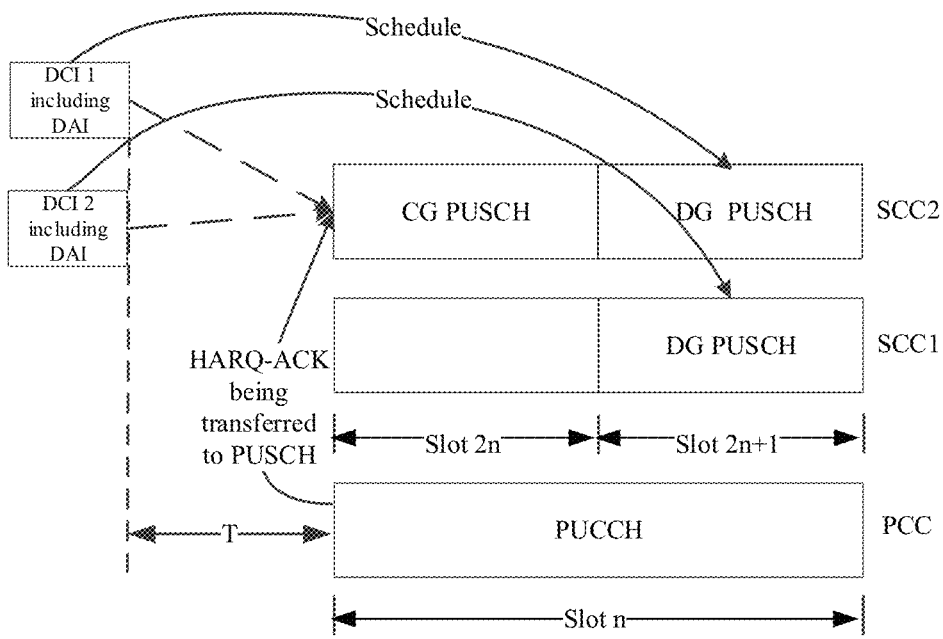

Fig.8

```
┌─────────────────────────────────────────────────────────────────┐
│ Determining a target Physical Uplink Shared Channel (PUSCH) for │
│ carrying Hybrid Automatic Repeat reQuest (HARQ) -Acknowledge    │── 901
│ (ACK), when a Physical Uplink Control Channel (PUCCH) carrying  │
│ the HARQ-ACK overlaps with a PUSCH in time domain               │
└─────────────────────────────────────────────────────────────────┘
                                 ↓
┌─────────────────────────────────────────────────────────────────┐
│ Obtaining an indication field of a Downlink Allocation Index    │
│ (DAI) in a Downlink Control Information (DCI) scheduling a      │── 902
│ second type of PUSCH, when the target PUSCH is a first type     │
│ of PUSCH                                                         │
└─────────────────────────────────────────────────────────────────┘
                                 ↓
┌─────────────────────────────────────────────────────────────────┐
│ Determining, according to the obtained indication field of the  │
│ DAI, the number of bits of the HARQ-ACK transmitted in the      │── 903
│ target PUSCH, and receiving the HARQ-ACK in the target PUSCH    │
│ according to the determined number of bits of the HARQ-ACK      │
└─────────────────────────────────────────────────────────────────┘
```

Fig.9

HARQ-ACK TRANSMISSION METHOD, USER EQUIPMENT, AND NETWORK SIDE DEVICE

CROSS-REFERENCE TO RELATED APPLICATIONS

This application is a U.S. national plase application of a PCT Application No. PCT/CN2020/086968 filed on Apr. 26, 2020, which claims a priority to a Chinese Patent Application No. 201910365174.0 filed on Apr. 30, 2019, the disclosures of which are incorporated herein by their reference in their entireties.

TECHNICAL FIELD

The present disclosure relates to the field of communications technology, and in particular, relates to a HARQ-ACK transmission method transmission method, a User Equipment (UE), and a network device.

BACKGROUND

In the related art, 5G NR does not support simultaneous transmissions (overlapping of time-domain resources) of a Physical Uplink Control Channel (PUCCH) and a Physical Uplink Shared Channel (PUSCH) in a Rel-15 phase. When all or part of symbols of the PUCCH and the PUSCH overlap, a Hybrid automatic repeat request acknowledgement (HARQ-ACK) transmitted in the PUCCH needs to be transferred to the PUSCH for transmission without transmitting the PUCCH, thereby avoiding simultaneous transmissions of the PUCCH and the PUSCH.

Transmissions of PUSCHs include two types of transmissions, one type of transmission is transmission of a PUSCH without scheduling by a corresponding Downlink Control Information (DCI), i.e., UL grant, such as a CG (Configuration Grant) PUSCH, and a PUSCH carrying SP-CSI (Semi-persistent channel state information includes a PUSCH scheduled by a DCI. For the PUSCH scheduled by the DCI, the DCI scheduling the PUSCH may include 1 or 2 bits or 4 bits for Downlink Assignment Index (DAI) which is used for indicating information of HARQ-ACK transmission in the PUSCH. For example, when transmission of a HARQ-ACK using a semi-static HARQ-ACK codebook is configured, 1 bit indicates whether HARQ-ACK exists; and when transmission of HARQ-ACK using a dynamic HARQ-ACK codebook is configured, 2 or 4 bits indicate the total number of bits of HARQ-ACK transmitted in the PUSCH. Auxiliary information may be provided to a user equipment to determine whether there exists a packet loss in downlink transmission, thereby generating the HARQ-ACK according to indication of the DAI, in order to avoid that, as a result of the packet loss in downlink, a network device and the user equipment do not share consistent understanding on the number of HARQ-ACK bits transmitted in the PUSCH. If transmission using Code Block Group (CBG) is not configured, the DAI has a length of 2 bits; and if the transmission using CBG is configured, the DAI has a length 4 bits, wherein 2 bits correspond to a sub-codebook for HARQ-ACK feedback based on a Transport Block (TB), and 2 bits correspond to a sub-codebook for HARQ-ACK feedback based on CBG. In case that the PUSCH does not have corresponding DCI scheduling or in case that the DCI scheduling the PUSCH does not contain the DAI, HARQ-ACK bits transmitted in the PUSCH cannot be determined according to the DAI in the DCI scheduling the PUSCH since the DAI cannot be obtained. Therefore, a problem that, as a result of downlink packet loss, the network device and the user equipment have inconsistent understanding of the number of bits of the HARQ-ACK transmitted in the PUSCH, resulting in decrease in transmission performance.

In summary, when HARQ-ACK needs to be transmitted in the PUSCH due to overlapping of PUCCH and PUSCH resources, and if a selected PUSCH is a PUSCH without DCI scheduling or a PUSCH scheduled by DCI, but the DCI does not contain UL DAI information, and no corresponding UL DAI information is available to assist in determining that HARQ-ACK is transmitted in the PUSCH, the network device and the user equipment have inconsistent understanding of the number of HARQ-ACK bits transmitted in the PUSCH as a result of the downlink packet loss, resulting in incorrect reception of PUSCH and HARQ-ACK.

SUMMARY

Embodiments of the present disclosure provide a HARQ-ACK transmission method, a user equipment, and a network device, so as to solve the problem that, as a result of a downlink packet loss, a network device and a user equipment have inconsistent understanding of the number of bits of HARQ-ACK transmitted in a PUSCH, resulting in incorrect reception of the PUSCH and the HARQ-ACK.

An embodiment of the present disclosure provides a Hybrid Automatic Repeat reQuest (HARQ)-Acknowledge (ACK) transmission method, performed by a user equipment. This method includes: determining a target Physical Uplink Shared Channel (PUSCH) for carrying the HARQ-ACK, when a Physical Uplink Control Channel (PUCCH) carrying the HARQ-ACK overlaps with at least one PUSCH in time domain; obtaining an indication field of a Downlink Allocation Index (DAI) in a Downlink Control Information (DCI) scheduling a second type of PUSCH, when the target PUSCH is a first type of PUSCH; determining, according to the obtained indication field of the DAI, the number of bits of the HARQ-ACK transmitted in the target PUSCH, and transmitting the HARQ-ACK in the target PUSCH according to the determined number of bits of the HARQ-ACK, wherein the first type of PUSCH is a PUSCH with a DCI scheduling or a PUSCH scheduled by a DCI without DAI, the second type of PUSCH is a PUSCH scheduled by a DCI with a DAI, the first type of PUSCH and the second type of PUSCH are overlapped with the same PUCCH in time domain.

An embodiment of the present disclosure also provides a method of transmitting Hybrid Automatic Repeat reQuest (HARQ)-Acknowledge (ACK), performed by a network device. The method includes: determining a target Physical Uplink Shared Channel (PUSCH) for carrying the HARQ-ACK, when a Physical Uplink Control Channel (PUCCH) carrying the HARQ-ACK overlaps with at least one PUSCH in time domain; obtaining an indication field of a Downlink Allocation Index (DAI) in a Downlink Control Information (DCI) scheduling a second type of PUSCH, when the target PUSCH is a first type of PUSCH; determining, according to the obtained indication field of the DAI, the number of bits of the HARQ-ACK transmitted in the target PUSCH, and receiving the HARQ-ACK in the target PUSCH according to the determined number of bits of the HARQ-ACK, wherein the first type of PUSCH is a PUSCH with a DCI scheduling or a PUSCH scheduled by a DCI without DAI, the second type of PUSCH is a PUSCH scheduled by a DCI with a DAI, the first type of PUSCH and the second type of PUSCH are overlapped with the same PUCCH in time domain.

An embodiment of the present disclosure also provides a user equipment. The user equipment includes a transceiver, a storage, a processor and a computer program stored on the storage and executable on the processor, wherein, when the processor executes the computer program, the processor implements following steps: determining a target Physical Uplink Shared Channel (PUSCH) for carrying a Hybrid Automatic Repeat reQuest (HARQ)-Acknowledge (ACK), when a Physical Uplink Control Channel (PUCCH) carrying the HARQ-ACK overlaps with at least one PUSCH in time domain; obtaining an indication field of a Downlink Allocation Index (DAI) in a Downlink Control Information (DCI) scheduling a second type of PUSCH, when the target PUSCH is a first type of PUSCH; determining, according to the obtained indication field of the DAI, the number of bits of the HARQ-ACK transmitted in the target PUSCH, and transmitting the HARQ-ACK in the target PUSCH according to the determined number of bits of the HARQ-ACK, wherein the first type of PUSCH is a PUSCH with a DCI scheduling or a PUSCH scheduled by a DCI without DAI, the second type of PUSCH is a PUSCH scheduled by a DCI with a DAI, the first type of PUSCH and the second type of PUSCH are overlapped with the same PUCCH in time domain.

An embodiment of the present disclosure also provides a network device. The network device includes a transceiver, a storage, a processor, and a computer program stored on the storage and executable by the processor, wherein, when the processor executes the computer program, the processor implements the following steps: determining a target Physical Uplink Shared Channel (PUSCH) for carrying a Hybrid Automatic Repeat reQuest (HARQ)-Acknowledge (ACK), when a Physical Uplink Control Channel (PUCCH) carrying the HARQ-ACK overlaps with at least one PUSCH in time domain; obtaining an indication field of a Downlink Allocation Index (DAI) in a Downlink Control Information (DCI) scheduling a second type of PUSCH, when the target PUSCH is a first type of PUSCH; determining, according to the obtained indication field of the DAI, the number of bits of the HARQ-ACK transmitted in the target PUSCH, and receiving the HARQ-ACK in the target PUSCH according to the determined number of bits of the HARQ-ACK, wherein the first type of PUSCH is a PUSCH with a DCI scheduling or a PUSCH scheduled by a DCI without DAI, the second type of PUSCH is a PUSCH scheduled by a DCI with a DAI, the first type of PUSCH and the second type of PUSCH are overlapped with the same PUCCH in time domain.

An embodiment of the present disclosure also provides a user equipment. The user equipment includes: a first PUSCH determination module, configured for determining a target Physical Uplink Shared Channel (PUSCH) for carrying a Hybrid Automatic Repeat reQuest (HARQ)-Acknowledge (ACK), when a Physical Uplink Control Channel (PUCCH) carrying the HARQ-ACK overlaps with at least one PUSCH in time domain; a first DAI obtaining module, configured for obtaining an indication field of a Downlink Allocation Index (DAI) in a Downlink Control Information (DCI) scheduling a second type of PUSCH, when the target PUSCH is a first type of PUSCH; a transmission module, configured for determining, according to the obtained indication field of the DAI, the number of bits of the HARQ-ACK transmitted in the target PUSCH, and transmitting the HARQ-ACK in the target PUSCH according to the determined number of bits of the HARQ-ACK, wherein the first type of PUSCH is a PUSCH with a DCI scheduling or a PUSCH scheduled by a DCI without DAI, the second type of PUSCH is a PUSCH scheduled by a DCI with a DAI, the first type of PUSCH and the second type of PUSCH are overlapped with the same PUCCH in time domain.

An embodiment of the present disclosure also provides a network device. The network device includes: a second PUSCH determination module, configured for determining a target Physical Uplink Shared Channel (PUSCH) for carrying Hybrid Automatic Repeat reQuest (HARQ)-Acknowledge (ACK), when a Physical Uplink Control Channel (PUCCH) carrying the HARQ-ACK overlaps with at least one PUSCH in time domain; a second DAI obtaining module, configured for obtaining an indication field of a Downlink Allocation Index (DAI) in a Downlink Control Information (DCI) scheduling a second type of PUSCH, when the target PUSCH is a first type of PUSCH; a receiving module, configured for determining, according to the obtained indication field of the DAI, the number of bits of the HARQ-ACK transmitted in the target PUSCH, and receiving the HARQ-ACK in the target PUSCH according to the determined number of bits of the HARQ-ACK, wherein the first type of PUSCH is a PUSCH with a DCI scheduling or a PUSCH scheduled by a DCI without DAI, the second type of PUSCH is a PUSCH scheduled by a DCI with a DAI, the first type of PUSCH and the second type of PUSCH are overlapped with the same PUCCH in time domain.

An embodiment of the present disclosure also provides a computer-readable storage medium having a computer program stored on the computer-readable storage medium, wherein when the computer program is executed by a processor, the processor implements the steps of the methods of transmitting HARQ-ACK according to the above.

Beneficial effects of the embodiments of the present disclosure are as follow.

When the PUSCH and the PUCCH carrying HARQ-ACK overlap in the time domain, and if the PUSCH not being scheduled by a DCI or the PUSCH scheduled by a DCI having no UL DAI information is selected to carry HARQ-ACK, UL DAI information in a DCI for another PUSCH scheduled by the DCI and overlapped with the PUCCH is used to assist in determining HARQ-ACK information transmitted in a PUSCH not being scheduled by a DCI or a PUSCH scheduled by a DCI having no UL DAI information, thereby enabling the network device and the user equipment to have the same understanding of the number of HARQ-ACK bits transmitted in the PUSCH, and further addressing the problem of incorrect reception of the PUSCH and HARQ-ACK.

BRIEF DESCRIPTION OF THE DRAWINGS

In order to more clearly explain technical solutions of embodiments of the present disclosure, drawings required for use in description of the embodiments of the present disclosure will be briefly introduced below. Obviously, the drawings in the following description are only some embodiments of the present disclosure, and for those of ordinary skill in the art, other drawings may be obtained from the drawings without expense of creative labor.

FIG. 8 shows a third schematic diagram of transmission of HARQ-ACK in an embodiment of the present disclosure;

FIG. 9 shows a flowchart of a HARQ-ACK transmission method in a second embodiment of the present disclosure;

DETAILED DESCRIPTION

Figure 1:
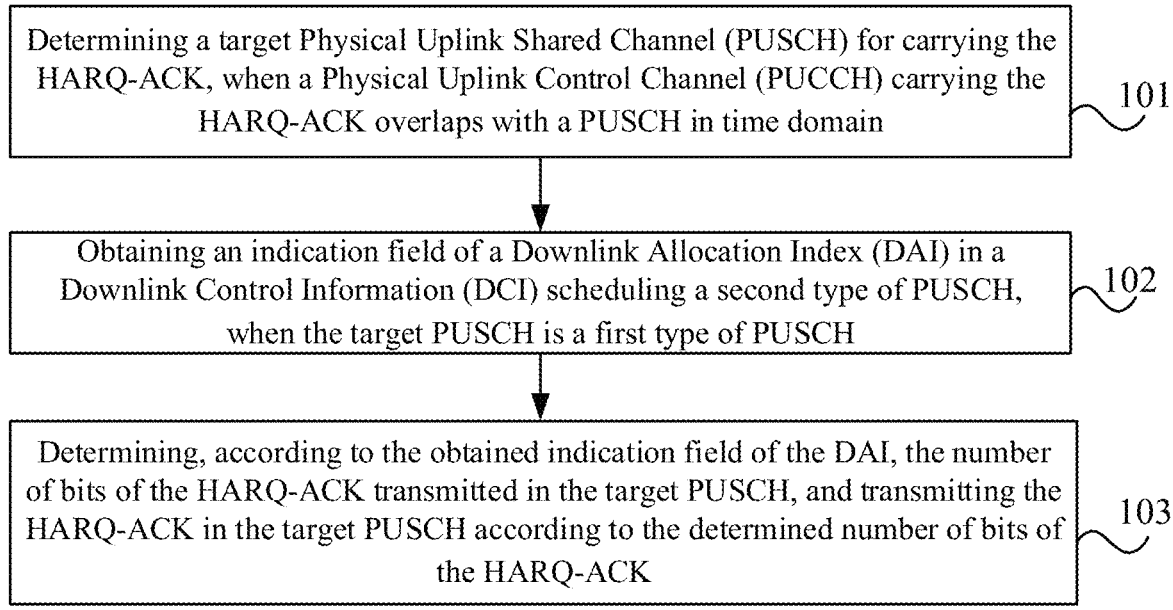
FIG. 1 shows a flowchart of a HARQ-ACK transmission method in a first embodiment of the present disclosure.

In order to make technical problems to be solved by the present disclosure, technical solutions and advantages of the present disclosure clearer, a detailed description will be given below with reference to the drawings and specific embodiments. In the following description, specific details such as specific configurations and components are provided merely to facilitate thorough understanding of the embodiments of the present disclosure. Accordingly, it will be apparent to those skilled in the art that various changes and modifications may be made to the embodiments described herein without departing from the scope and the spirit of the present disclosure. In addition, description of known functions and configurations are omitted for clarity and conciseness.

It should be understood that reference to "one embodiment" or "an embodiment" throughout the specification is understood to mean that a particular feature, structure, or characteristic associated with an embodiment is included in at least one embodiment of the present disclosure. Accordingly, references to "in one embodiment" or "in an embodiment" throughout the specification do not necessarily refer to the same embodiment. Furthermore, these particular features, structures, or characteristics may be combined in any suitable manner in one or more embodiments.

In various embodiments of the present disclosure, it should be understood that values of sequence numbers of following processes does not imply an execution order of the processes, the execution order of the processes should be determined by their functions and inherent logic, and should not be construed as any limitation on implementation processes of the embodiments of the present disclosure.

In addition, such terms as "system" and "network" herein are often used interchangeably herein.

In the embodiments provided herein, it should be understood that "B corresponding to A" means that B is associated with A, B can be determined from A. However, it should also be understood that B is determined from A does not mean that B is determined only from A, but may also be determined from A and/or other information.

In the embodiments of the present disclosure, forms of access networks are not limited, may be access networks including a Macro Base Station, a Pico Base Station, a Node B (referred to as a 3G mobile network device), an enhanced network device (eNB), a gNB (referred to as a 5G mobile network device), a home enhanced network device (Femto eNB or Home eNode B or Home eNB or HeNB), a relay station, an access point, a RRU (Remote Radio Unit), a RRH (Remote Radio Head), etc. The user equipment may be a mobile telephone (or a handset) or other device capable of sending or receiving radio signals, including a User Equipment (UE), a Personal Digital Assistant (PDA), a wireless modem, a wireless communication device, a handheld device, a laptop computer, a cordless telephone, a Wireless Local Loop (WLL) station, a Customer Premise Equipment (CPE) capable of converting a mobile signal into a WiFi signal, a mobile smart hotspot, a smart home appliance, or other devices capable of communicating with a mobile communication network spontaneously without human operation.

First Embodiment

An embodiment of the present disclosure provides a Hybrid Automatic Repeat Request Acknowledge (HARQ-ACK) transmission method, which is applied to a user equipment such as a terminal. The method solves a problem that, as a result of downlink packet loss, a network device and a user equipment have inconsistent understanding of the number of bits of the HARQ-ACK transmitted in a PUSCH, resulting in incorrect reception of the PUSCH and the HARQ-ACK.

As shown in FIG. 1, the HARQ-ACK transmission method in the embodiment of the present disclosure specifically includes following steps 101-103.

Step 101: when a Physical Uplink Control Channel (PUCCH) carrying HARQ-ACK overlaps with at least one Physical Uplink Shared Channel (PUSCH) in time domain, determining a target PUSCH for carrying the HARQ-ACK.

Step 102: when the target PUSCH is a first type of PUSCH, obtaining an indication field of a Downlink Allocation Index (DAI) in a Downlink Control Information (DCI) scheduling a second type of PUSCH.

Step 103: determining, according to the obtained indication field of the DAI, the number of bits of HARQ-ACK transmitted in the target PUSCH, and transmitting the HARQ-ACK in the target PUSCH according to the determined number of bits of the HARQ-ACK.

The first type of PUSCH is a PUSCH with a DCI scheduling, or a PUSCH scheduled by a DCI (such as scheduled by a DCI format 0_0) not including a DAI, wherein, for example, CG PUSCH is the first type of PUSCH. The second type of PUSCH is a PUSCH scheduled by a DCI (for example, scheduled by a DCI format 0_1) including a DAI, or a PUSCH other than the first type of PUSCH. The first type of PUSCH and the second type of PUSCH are overlapped with the same PUCCH in time domain.

As can be known from the above, the embodiment of the present disclosure uses UL DAI information in a DCI for another PUSCH scheduled by a DCI and overlapping with a PUCCH carrying HARQ-ACK, to assist in determining information of HARQ-ACK transmitted in a PUSCH with a DCI scheduling or a PUSCH scheduled by a DCI with no UL DAI information included in the DCI, thereby avoiding the problem that, as a result of downlink packet loss, the network device and the user equipment have inconsistent understanding of the number of HARQ-ACK bits transmitted in the PUSCH, thereby causing incorrect reception of the PUSCH and the HARQ-ACK.

Optionally, the first type of PUSCH and/or the second type of PUSCH are PUSCHs transmitted in a time duration corresponding to a slot in which the PUCCH is transmitted.

That is, the first type of PUSCH is a PUSCH transmitted in the time duration corresponding to the slot in which the PUCCH is transmitted; or, the second type of PUSCH is a PUSCH transmitted in the time duration corresponding to the slot in which the PUCCH is transmitted; or both the first type of PUSCH and the second type of PUSCH are PUSCHs transmitted in the time duration corresponding to the slot in which the PUCCH is transmitted.

For example, when the PUCCH and the PUSCH have the same subcarrier spacing, the PUSCH is the PUSCH transmitted in the slot in which the PUCCH is transmitted, that is, when the same subcarrier spacing is used for the PUCCH and the PUSCH, the PUSCH is transmitted in a slot n, if the PUCCH is transmitted in the slot n.

For example, when the subcarrier spacing of the PUCCH is greater than the subcarrier spacing of the PUSCH, the second type of PUSCH is a second type of PUSCH in a PUSCH slot overlapping with a slot in which the PUCCH is transmitted, that is, when the subcarrier spacing of the PUCCH is larger than the subcarrier spacing of the PUSCH, if the PUCCH is transmitted in at least one slot of a slot s*n to a slot s*n+s−1, then the PUSCH is transmitted in a slot n, wherein s represents a multiple obtained by dividing a subcarrier spacing of the PUCCH by a subcarrier spacing of the PUSCH.

For example, when the subcarrier spacing of the PUCCH is smaller than the subcarrier spacing of the PUSCH, the second type of PUSCH is a second type of PUSCH transmitted in a PUSCH slot including in a time duration corresponding to a slot in which the PUCCH is transmitted, that is, when the subcarrier spacing of the PUCCH is smaller than the subcarrier spacing of the PUSCH, if the PUCCH is transmitted in a slot n, then the PUSCH is transmitted in at least one slot of a slot k*n to a slot k*n+k−1, where k represents a multiple obtained by dividing the subcarrier spacing of the PUSCH by the subcarrier spacing of the PUCCH; where n is an integer.

In addition, $s=2^{\mu_{PUCCH}-\mu_{PUSCH}}$, $k=2^{\mu_{PUSCH}-\mu_{PUCCH}}$, $\mu_{PUSCH}$ indicates a configuration index of the subcarrier spacing of the PUSCH and $\mu_{PUCCH}$ indicates a configuration index of the subcarrier spacing of the PUCCH.

From the above, specific examples of the embodiments of the present disclosure are as follow.

Assuming that a user equipment is configured with two carriers, a subcarrier spacing used by a PCC is 15 kHz, and a subcarrier spacing used by a SCC is 30 kHz, then one slot on the PCC includes two slots on the SCC. In this case, it is assumed that the user equipment has a PUCCH transmission in a slot n on the PCC (for example, the network device schedules one or more PDSCHs which need HARQ-ACK feedback in the slot n, the HARQ-ACK feedback is then transmitted in a PUCCH resource indicated by a DCI scheduling the PDSCHs.

Figure 6:
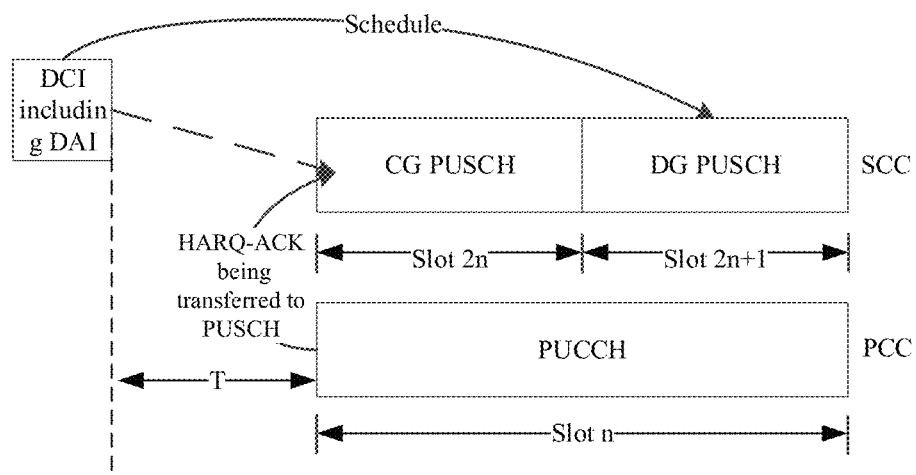
FIG. 6 shows a first schematic diagram of transmission of HARQ-ACK in an embodiment of the present disclosure.

As shown in FIG. 6, it is assumed that a slot 2n is a transmission opportunity allocated to a CG PUSCH, and the user equipment has one CG PUSCH (i.e., the first type of PUSCH) transmission in the opportunity (i.e., there is data to be transmitted in a CG resource; if there is no data, then the CG PUSCH is not transmitted in this CG transmission opportunity, that is, a PUSCH transmission does not exist in all CG transmission opportunity), and the network device schedules, through the DCI, the user equipment to transmit a PUSCH in a slot 2n+1, that is, one Dynamic Grant (DG) PUSCH (i.e., the second type of PUSCH) exists in the slot 2n+1.

Since a resource of the PUCCH overlaps with resources of multiple PUSCHs, one PUSCH needs to be selected so that the HARQ-ACK in the PUCCH may be transmitted by the selected PUSCH and the PUCCH is not transmitted to avoid the resource of the PUCCH from overlapping with the resources of the PUSCHs. Assuming that according to a PUSCH selection rule (e.g., when there are a plurality of slots in which a PUSCH overlaps with a PUCCH, the PUSCH in the first slot is selected), then the user equipment selects the CG PUSCH to transmit HARQ-ACK information originally carried in the PUCCH.

It is assumed that the network device schedules three PDSCHs needing HARQ-ACK feedback to be performed in the PUCCH, and the user equipment only receives two PDSCHs, HARQ-ACK feedback of which are transmitted in the PUCCH, then it may be determined that one PDSCH is lost according to DAI=3 in the received DCI scheduling the PUSCH, thereby generating a 3-bit HARQ-ACK and transmitting the HARQ-ACK in the selected CG PUSCH. The first two bits of the 3-bit HARQ-ACK correspond to the two received PDSCHs, and the remaining one bit is NACK, which indicates that the HARQ-ACK information of the lost PDSCH is finally determined by the above DAI, thereby ensuring that the number of HARQ-ACK bits transmitted in the PUSCH is consistent with the number of HARQ-ACK bits expected, by the network device, to be transmitted in the PUSCH, and avoiding erroneous reception of the PUSCH and the HARQ-ACK by the network side.

Figure 2:
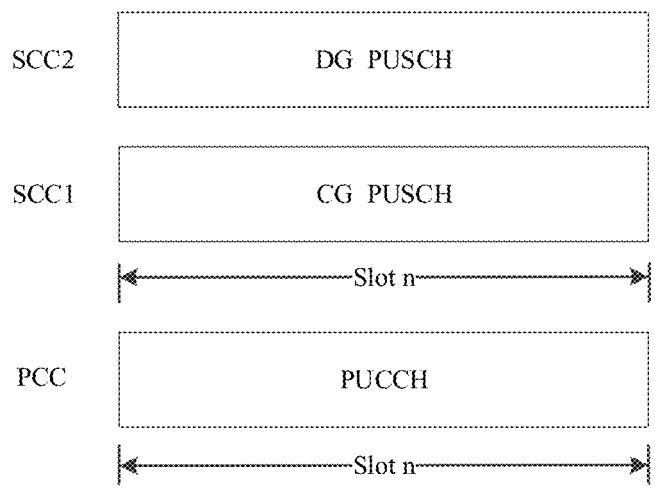
FIG. 2 shows a first comparison schematic diagram, in an embodiment of the present disclosure, of carriers and slots in which a first type of PUSCH, a second type of PUSCH and a PUCCH are located.
Figure 3:
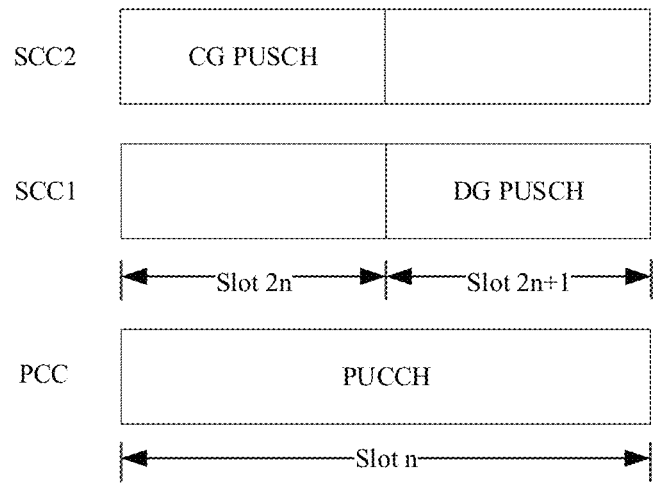
FIG. 3 shows a second comparison schematic diagram, in an embodiment of the present disclosure, of carriers and slots in which a first type of PUSCH, a second type of PUSCH and a PUCCH are located.

In addition, in case of carry aggregation, the PUCCH may overlap with multiple PUSCHs on multiple carriers at the same time, the PUSCHs on the multiple carriers may be in the same slot, or may be in different slots (e.g., the sub-carrier spacing used by the PUCCH is smaller than the sub-carrier spacings used by the PUSCHs), as in FIG. 2 and FIG. 3.

There may also exist that one PUCCH is overlapped with each of multiple PUSCHs not overlapping with each other in the time-domain. The multiple PUSCHs may be in the same slot, or may be in different slots (e.g., the sub-carrier spacing used by the PUCCH is smaller than the sub-carrier spacings used by the PUSCHs), as shown in FIG. 4 and FIG. 5.

Under this condition, it is necessary to select one PUSCH from the multiple PUSCHs overlapped with the PUCCH to carry the HARQ-ACK transmission in the PUCCH. When selecting a PUSCH without UL DAI (e.g., a PUSCH without being scheduled by DCI, or a PUSCH being scheduled by a DCI having no DAI) to carry the HARQ-ACK, no UL DAI information may be used to assist in determining the number of bits of HARQ-ACK feedback information transmitted in the PUSCH. In the embodiment of the present disclosure, when the PUSCH and the PUCCH carrying HARQ-ACK overlap in the time domain, and if the PUSCH without being scheduled by a DCI or the PUSCH scheduled by a DCI having no UL DAI information is selected to carry HARQ-ACK, UL DAI information in a DCI for another PUSCH scheduled by the DCI and overlapped with the PUCCH is used to assist in determining HARQ-ACK information transmitted in a PUSCH without being scheduled by a DCI or a PUSCH scheduled by a DCI having no UL DAI information, thereby enabling the network device and the user equipment to have the same understanding of the number of HARQ-ACK bits transmitted in the PUSCH, and further addressing the problem of incorrect reception of the PUSCH and HARQ-ACK.

Figure 4:
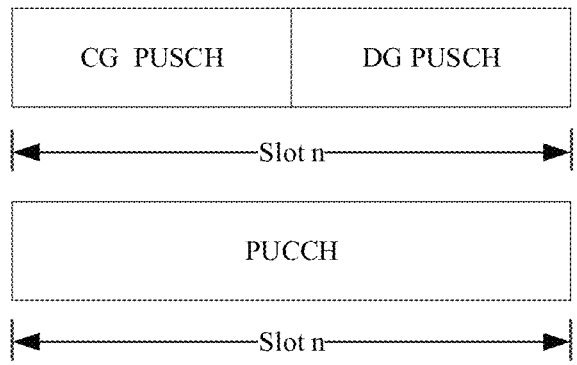
FIG. 4 shows a third comparison schematic diagram, in an embodiment of the present disclosure, of carriers and slots in which a first type of PUSCH, a second type of PUSCH and a PUCCH are located.
Figure 5:
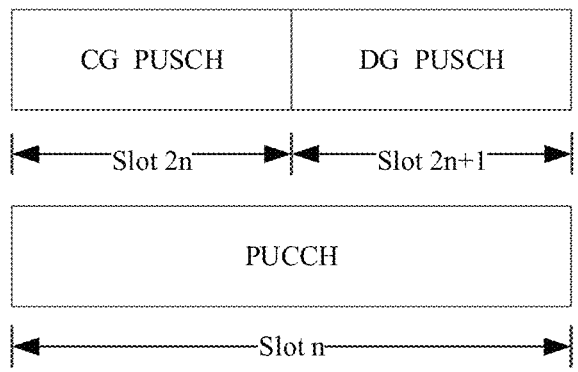
FIG. 5 shows a fourth comparison schematic diagram, in an embodiment of the present disclosure, of carriers and slots in which a first type of PUSCH, a second type of PUSCH and a PUCCH are located.

Optionally, the second type of PUSCH and the first type of PUSCH are located on the same carrier or on different carriers, for example, the first type of PUSCH is a CG PUSCH and the second type of PUSCH is a DG PUSCH, as shown in FIG. 2 and FIG. 3, the CG PUSCH is located on a second secondary carrier SCC2, the DG PUSCH is located on a first secondary carrier SCC1, in this case, the second type of PUSCH and the first type of PUSCH are located on different carriers; or as shown in FIG. 4 and FIG. 5, the CG PUSCH and the DG PUSCH are located on the same carrier, that is, the second type of PUSCH and the first type of PUSCH are located on the same carrier.

Optionally, the second type of PUSCH and the first type of PUSCH are located in the same slot or in different slots, for example, the first type of PUSCH is the CG PUSCH and the second type of PUSCH is the DG PUSCH, as shown in FIG. 2 and FIG. 4, the CG PUSCH is located in a slot n, the DG PUSCH is located in the slot n, in this case, the second type of PUSCH and the first type of PUSCH are located in the same slot; or as shown in FIGS. 3 and 5, the CG PUSCH is located in a slot 2n, the DG PUSCH is located in a slot 2n+1, in this case, the second type of PUSCH and the first type of PUSCH are located in different slots.

Optionally, when there are a plurality of PUSCHs of the second type, indication values in indication fields of DAI in the DCIs scheduling the plurality of PUSCHs of the second type are the same.

Optionally, the obtaining the indication field of the Downlink Allocation Index (DAI) in the downlink control information (DCI) scheduling the second type of PUSCH includes: when the subcarrier spacing of the PUSCH is greater than the subcarrier spacing of the PUCCH, and/or when a plurality of PUSCHs overlap with the PUCCH in the time domain and the second type of PUSCH exists in the plurality of PUSCHs, obtaining the indication field of the DAI in the DCI scheduling the second type of PUSCH.

From the above, the embodiments of the present disclosure may be further exemplified as follows.

Figure 7:
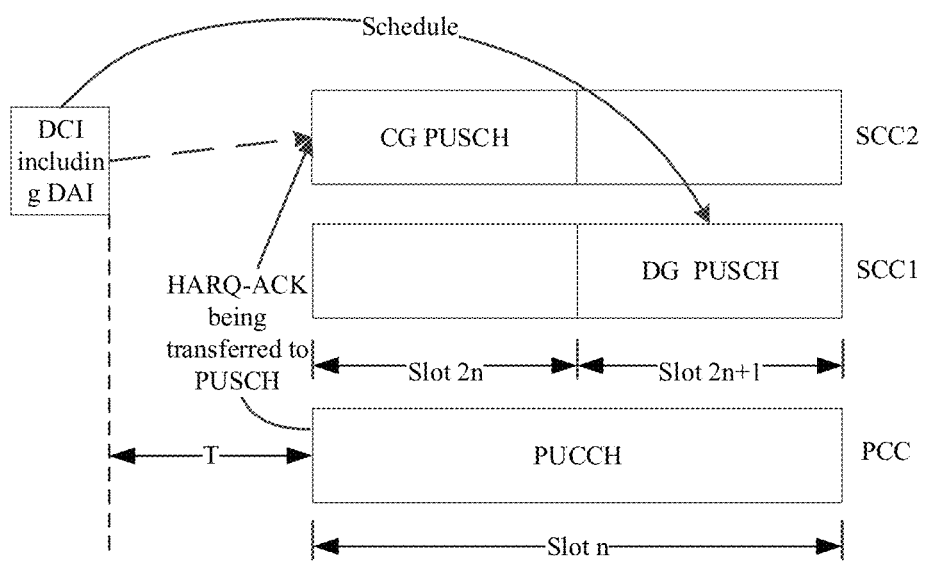
FIG. 7 shows a second schematic diagram of transmission of HARQ-ACK in an embodiment of the present disclosure.

Assuming that the user equipment is configured with three carriers, the subcarrier spacing used by PCC is 15 kHz, and the subcarrier spacing used by SCC1 and SCC2 is 30 kHz, one slot on PCC includes two slots on SCC. As shown in FIG. 7, it is assumed that the user equipment has a PUCCH transmission in a slot n on the PCC (e.g., the network device schedules one or more PDSCHs requiring HARQ-ACK feedback in the slot n, the HARQ-ACK feedback is then transmitted in a PUCCH resource indicated by the DCI scheduling the PDSCHs). It is assumed that the slot 2n on SCC2 is a transmission opportunity configured to the CG PUSCH, and the user equipment has one CG PUSCH transmission in the opportunity (i.e. there is data to be transmitted in a CG resource, and if there is no data, then the CG PUSCH is not transmitted in this CG transmission opportunity, that is, not all CG transmission opportunities are used for PUSCH transmission), and the network device schedules, through DCI, the user equipment to perform PUSCH transmission in the slot 2n+1 of SCC1, that is, there is one DG PUSCH in the slot 2n+1 of SCC1. Since the resource of the PUCCH overlaps with resources of multiple PUSCHs, one PUSCH needs to be selected for transmitting the HARQ-ACK in the PUCCH, so that the PUCCH is not transmitted to avoid the resource of the PUCCH from overlapping with the resources of the PUSCHs. Assuming that according to the PUSCH selection rule (for example, when PUSCHs in a plurality of slots overlap with the PUCCH, a PUSCH in the first slot of the slots is selected), HARQ-ACK information originally carried in the PUCCH is selected to be transmitted in the CG PUSCH.

Here, in a similar way, it is assumed that the network device schedules three PDSCHs requiring HARQ-ACK feedback to be performed in the PUCCH, and the user equipment receives only two PDSCHs, HARQ-ACK feedbacks of which are performed in the PUCCH. It may be determined, according to DAI=3 in the received DCI scheduling a PUSCH, that one PDSCH is lost by the user equipment, thereby generating a 3-bit HARQ-ACK, which is transmitted in the selected CG PUSCH, wherein the first two bits of the 3 bits correspond to the received two PDSCHs, the last bit is NACK indicating that HARQ-ACK information of the lost PDSCH is finally determined by the DAI, thereby ensuring that the number of HARQ-ACK bits is consistent with the number of HARQ-ACK bits expected by the network device to be transmitted in the PUSCH and avoiding erroneous reception of PUSCH and HARQ-ACK by the network device.

In addition, if the network device schedules, through DCI, one DG PUSCH to be transmitted in the slot 2n+1 of SCC2, that is, there are multiple PUSCHs of the second type overlapping with the PUCCH at the same time, as shown in FIG. 8. In this case, the network device needs to set DAI values in DCI 1 and DCI 2 as the same value, for example, three, so as to avoid a case that the user equipment does not know which value is used to be referred to for determining the HARQ-ACK in the CG PUSCH in case that the DAI values are different. If the user equipment side loses one of the DG PUSCHs, for example, only one of DCI 1 or DCI 2 is received, a corresponding DAI value may also be obtained for determining the HARQ-ACK in the CG PUSCH.

Second Embodiment

An embodiment of the present disclosure provides a transmission method of Hybrid Automatic Repeat reQuest Acknowledge (HARQ-ACK), which is applied to a network device such as a base station. This solution solves the problem that as result of a downlink packet loss, the network device and the user equipment do not have consistent understanding on the number of HARQ-ACK bits transmitted in the PUSCH, resulting in incorrect reception of a PUSCH and a HARQ-ACK.

As shown in FIG. 9, a HARQ-ACK transmission method in the embodiment of the present disclosure specifically includes the following steps 901-903.

Step 901: when a Physical Uplink Control Channel (PUCCH) carrying HARQ-ACK overlaps with at least one Physical Uplink Shared Channel (PUSCH) in time domain, determining a target PUSCH for carrying the HARQ-ACK.

Step 902: when the target PUSCH is a first type of PUSCH, obtaining an indication field of a Downlink Allocation Index (DAI) in a Downlink Control Information (DCI) scheduling a second type of PUSCH.

Step 903: determining, according to the obtained indication field of the DAI, the number of bits of HARQ-ACK transmitted in the target PUSCH, and receiving the HARQ-ACK in the target PUSCH according to the determined number of bits of the HARQ-ACK.

The first type of PUSCH is a PUSCH with a DCI scheduling, or a PUSCH scheduled by a DCI (such as scheduled by a DCI format 0_0) not including a DAI, wherein, for example, CG PUSCH is the first type of PUSCH. The second type of PUSCH is a PUSCH scheduled by a DCI (for example, scheduled by a DCI format 0_1) including a DAI, or a PUSCH other than the first type of PUSCH. The first type of PUSCH and the second type of PUSCH are overlapped with the same PUCCH in time domain.

As can be known from the above, the embodiment of the present disclosure uses UL DAI information in a DCI for another PUSCH scheduled by a DCI and overlapping with a PUCCH carrying HARQ-ACK, to assist in determining information of HARQ-ACK transmitted in a PUSCH with a DCI scheduling or a PUSCH scheduled by a DCI with no UL DAI information included in the DCI, thereby avoiding the problem that, as a result of downlink packet loss, the network device and the user equipment have inconsistent understanding of the number of HARQ-ACK bits transmitted in the PUSCH, thereby causing incorrect reception of the PUSCH and the HARQ-ACK.

Optionally, the first type of PUSCH and/or the second type of PUSCH are PUSCHs transmitted in a time duration corresponding to a slot in which the PUCCH is transmitted.

That is, the first type of PUSCH is a PUSCH transmitted in the time duration corresponding to the slot in which the PUCCH is transmitted; or, the second type of PUSCH is a PUSCH transmitted in the time duration corresponding to the slot in which the PUCCH is transmitted; or both the first type of PUSCH and the second type of PUSCH are PUSCHs transmitted in the time duration corresponding to the slot in which the PUCCH is transmitted.

Further, at least one of the following exists: when the same subcarrier spacing is used for the PUCCH and the PUSCH, the PUSCH is transmitted in a slot n, if the PUCCH is transmitted in the slot n; when the subcarrier spacing of the PUCCH is larger than the subcarrier spacing of the PUSCH, if the PUCCH is transmitted in at least one slot of a slot s*n to a slot s*n+s−1, then the PUSCH is transmitted in a slot n, wherein s represents a multiple obtained by dividing a subcarrier spacing of the PUCCH by a subcarrier spacing of the PUSCH; when the subcarrier spacing of the PUCCH is smaller than the subcarrier spacing of the PUSCH, if the PUCCH is transmitted in a slot n, then the PUSCH is transmitted in at least one slot of a slot k*n to a slot k*n+k−1, where k represents a multiple obtained by dividing the subcarrier spacing of the PUSCH by the subcarrier spacing of the PUCCH; where n is an integer.

In addition, $s=2^{\mu_{PUCCH}-\mu_{PUSCH}}$, $k=2^{\mu_{PUSCH}-\mu_{PUCCH}}$, $\mu_{PUSCH}$ indicates a configuration index of the subcarrier spacing of the PUSCH and $\mu_{PUCCH}$ indicates a configuration index of the subcarrier spacing of the PUCCH.

From the above, specific examples of the embodiments of the present disclosure are as follow.

Assuming that a user equipment is configured with two carriers, a subcarrier spacing used by a PCC is 15 kHz, and a subcarrier spacing used by a SCC is 30 kHz, then one slot on the PCC includes two slots on the SCC. In this case, it is assumed that the user equipment has a PUCCH transmission in a slot n on the PCC (for example, the network device schedules one or more PDSCHs which need HARQ-ACK feedback in the slot n, the HARQ-ACK feedback is then transmitted in a PUCCH resource indicated by a DCI scheduling the PDSCHs.

As shown in FIG. 6, it is assumed that a slot 2n is a transmission opportunity allocated to a CG PUSCH, and the user equipment has one CG PUSCH (i.e., the first type of PUSCH) transmission in the opportunity (i.e., there is data to be transmitted in a CG resource; if there is no data, then the CG PUSCH is not transmitted in this CG transmission opportunity, that is, a PUSCH transmission does not exist in all CG transmission opportunity), and the network device schedules, through the DCI, the user equipment to transmit a PUSCH in a slot 2n+1, that is, one Dynamic Grant (DG) PUSCH (i.e., the second type of PUSCH) exists in the slot 2n+1.

Since a resource of the PUCCH overlaps with resources of multiple PUSCHs, one PUSCH needs to be selected so that the HARQ-ACK in the PUCCH may be transmitted by the selected PUSCH and the PUCCH is not transmitted to avoid the resource of the PUCCH from overlapping with the resources of the PUSCHs. Assuming that according to a PUSCH selection rule (e.g., when there are a plurality of slots in which a PUSCH overlaps with a PUCCH, the PUSCH in the first slot is selected), then the user equipment selects the CG PUSCH to transmit HARQ-ACK information originally carried in the PUCCH.

It is assumed that the network device schedules three PDSCHs needing HARQ-ACK feedback to be performed in the PUCCH, then the network device expects to receive HARQ-ACKs (for example, assuming that each PDSCH corresponding to a HARQ-ACK of one bit, then a 3-bit HARQ-ACK is sent) corresponding to the three PDSCHs in a PUSCH carrying the HARQ-ACKs. The network device may configure a DAI=3 in a DCI scheduling a PUSCH (for example, the DG PUSCH in FIG. 6), a resource of which overlaps with a resource of the PUCCH, so as to inform a user equipment of the number of HARQ-ACKs, needing to be transmitted in a PUSCH, of downlink transmission.

In addition, a certain time duration T is satisfied between the last symbol of the DCI scheduling the PUSCH overlapped with the PUCCH and the first symbol of the earliest channel in an overlapping channel set, thereby ensuring that when the user equipment transmits the HARQ-ACK, originally carried in the PUCCH, in the CG PUSCH, there is sufficient time to determine the HARQ-ACK information with reference to the DAI value in the DCI (certainly when the user equipment receives these channels, it will also be judged that the above time requirement is satisfied, so there is enough time for processing). The overlapping channel set is a channel set composed of a PUCCH and all PUSCHs overlapped with the PUCCH, as shown in FIG. 6, the channel set is a channel set composed of a PUCCH in a slot n of PCC, a CG PUSCH in a slot 2n of SCC and a DG PUSCH in a slot 2n+1, and the first symbol of the earliest channel in this set is the first symbol of the PUCCH and the CG PUSCH. T is a processing time determined according to a processing capability of the terminal and other configuration parameters, for example, $T=\max((N_2+d_{2,1}+1)\cdot(2048+144)\cdot\kappa\cdot2^{-\mu}\cdot d_{22})$ wherein, p is a numbering value of the smallest subcarrier spacing among subcarrier spacings of the PDCCH (i.e., a channel of DCI transmission for scheduling a PUSCH), a PUCCH and a PUSCH; $d_{2,1}$ is a parameter related to DMRS (DeModulation Reference Signal) configuration of a PUSCH, for example, if the first symbol of PUSCH contains only DMRS, then $d_{2,1}=0$, otherwise $d_{2,1}=1$; $d_{2,2}$ is a parameter related to BWP (BandWidth Part) switching, for example, if the PDCCH scheduling the PUSCH triggers BWP switching, then $d_{2,2}$ is a predetermined time interval required for BWP switching, otherwise $d_{2,2}=0$; is a basic time unit in NR, K is the ratio between a basic time unit in Long Term Evolution (LTE) and the basic time unit in NR.

In addition, the network device may determine that the PUCCH and the CG PUSCH overlap in respect of resources according to configuration of the CG PUSCH and a PUCCH resource. Since the network device does not clearly know whether the terminal actually has PUSCH transmission in a CG PUSCH resource, the network device may first make an assumption that CG PUSCH transmission exists, so as to determine, according to the PUSCH selection rule, that the CG PUSCH is used for carrying HARQ-ACK, and determine HARQ-ACK bits in the CG PUSCH according to the DAI in the DCI scheduling the DG PUSCH, and receive the CG PUSCH and the HARQ-ACK on the CG resource according to this assumption. If the CG PUSCH and the HARQ-ACK are received, it is indicated that the user equipment transmits the CG PUSCH, and thus the network device obtains the CG PUSCH and the HARQ-ACK, and only receives data in the CG PUSCH resource scheduled to the user equipment through the DCI (i.e., assuming that there is no HARQ-ACK); if the CG PUSCH or the HARQ-ACK are not received, then there is a need to further receive data and HARQ-ACK in the DG PUSCH according to the determined HARQ-ACK bits. The network device may also judge whether the CG PUSCH exists, by detecting the DMRS configured to the CG PUSCH, and when it is judged that the CG PUSCH exists, then the network device receives data and HARQ-ACK in the CG PUSCH according to the determined HARQ-ACK bits; if it is judged that the CG PUSCH does not to exist, the network device further receives data and HARQ-ACK in the DG PUSCH according to the determined HARQ-ACK bits.

In case of carry aggregation, the PUCCH may overlap with multiple PUSCHs on multiple carriers at the same time, the PUSCHs on the multiple carriers may be in the same slot, or may be in different slots (e.g., the sub-carrier spacing used by the PUCCH is smaller than the sub-carrier spacings used by the PUSCHs), as in FIG. 2 and FIG. 3.

There may also exist that one PUCCH is overlapped with each of multiple PUSCHs not overlapping with each other in the time-domain. The multiple PUSCHs may be in the same slot, or may be in different slots (e.g., the sub-carrier spacing used by the PUCCH is smaller than the sub-carrier spacings used by the PUSCHs), as shown in FIG. 3 and FIG. 4.

Under this condition, it is necessary to select one PUSCH from the multiple PUSCHs overlapped with the PUCCH to carry the HARQ-ACK transmission in the PUCCH. When selecting a PUSCH without UL DAI (e.g., a PUSCH without being scheduled by DCI, or a PUSCH being scheduled by a DCI having no DAI) to carry the HARQ-ACK, no UL DAI information may be used to assist in determining the number of bits of HARQ-ACK feedback information transmitted in the PUSCH. In the embodiment of the present disclosure, when the PUSCH and the PUCCH carrying HARQ-ACK overlap in the time domain, and if the PUSCH without being scheduled by a DCI or the PUSCH scheduled by a DCI having no UL DAI information is selected to carry HARQ-ACK, UL DAI information in a DCI for another PUSCH scheduled by the DCI and overlapped with the PUCCH is used to assist in determining HARQ-ACK information transmitted in a PUSCH without being scheduled by a DCI or a PUSCH scheduled by a DCI having no UL DAI information, thereby enabling the network device and the user equipment to have the same understanding of the number of HARQ-ACK bits transmitted in the PUSCH, and further addressing the problem of incorrect reception of the PUSCH and HARQ-ACK.

Optionally, the second type of PUSCH and the first type of PUSCH are located on the same carrier or on different carriers, for example, the first type of PUSCH is a CG PUSCH and the second type of PUSCH is a DG PUSCH, as shown in FIG. 2 and FIG. 3, the CG PUSCH is located on a second secondary carrier SCC2, the DG PUSCH is located on a first secondary carrier SCC1, in this case, the second type of PUSCH and the first type of PUSCH are located on different carriers; or as shown in FIG. 4 and FIG. 5, the CG PUSCH and the DG PUSCH are located on the same carrier, that is, the second type of PUSCH and the first type of PUSCH are located on the same carrier.

Optionally, the second type of PUSCH and the first type of PUSCH are located in the same slot or in different slots, for example, the first type of PUSCH is the CG PUSCH and the second type of PUSCH is the DG PUSCH, as shown in FIG. 2 and FIG. 4, the CG PUSCH is located in a slot n, the DG PUSCH is located in the slot n, in this case, the second type of PUSCH and the first type of PUSCH are located in the same slot; or as shown in FIGS. 3 and 5, the CG PUSCH is located in a slot 2n, the DG PUSCH is located in a slot 2n+1, in this case, the second type of PUSCH and the first type of PUSCH are located in different slots.

From the above, the embodiments of the present disclosure may be further exemplified as follows.

Assuming that the user equipment is configured with three carriers, the subcarrier spacing used by PCC is 15 kHz, and the subcarrier spacing used by SCC1 and SCC2 is 30 kHz, one slot on PCC includes two slots on SCC. As shown in FIG. 7, it is assumed that the user equipment has a PUCCH transmission in a slot n on the PCC (e.g., the network device schedules one or more PDSCHs requiring HARQ-ACK feedback in the slot n, the HARQ-ACK feedback is then transmitted in a PUCCH resource indicated by the DCI scheduling the PDSCHs). It is assumed that the slot 2n on SCC2 is a transmission opportunity configured to the CG PUSCH, and the user equipment has one CG PUSCH transmission in the opportunity (i.e. there is data to be transmitted in a CG resource, and if there is no data, then the CG PUSCH is not transmitted in this CG transmission opportunity, that is, not all CG transmission opportunities are used for PUSCH transmission), and the network device schedules, through DCI, the user equipment to perform PUSCH transmission in the slot 2n+1 of SCC1, that is, there is one DG PUSCH in the slot 2n+1 of SCC1. Since the resource of the PUCCH overlaps with resources of multiple PUSCHs, one PUSCH needs to be selected for transmitting the HARQ-ACK in the PUCCH, so that the PUCCH is not transmitted to avoid the resource of the PUCCH from overlapping with the resources of the PUSCHs. Assuming that according to the PUSCH selection rule (for example, when PUSCHs in a plurality of slots overlap with the PUCCH, a PUSCH in the first slot of the slots is selected), HARQ-ACK information originally carried in the PUCCH is selected to be transmitted in the CG PUSCH.

In addition, the network device may determine that the PUCCH overlaps with the CG PUSCH according to the configuration of the CG PUSCH and the PUCCH resource. since the network device does not clearly know whether the user equipment actually has PUSCH transmission in the CG PUSCH resource, the network device may first assume that CG PUSCH transmission exists, so as to determine, according to PUSCH selection rule, that the CG PUSCH is used for carrying HARQ-ACK, and determine HARQ-ACK bits in the CG PUSCH according to the DAI in the DCI scheduling the DG PUSCH. If CG PUSCH and HARQ-ACK are to be received on the CG resource accord to this assumption. If CG PUSCH and HARQ-ACK are actually received, then the user equipment transmits the CG PUSCH, and thus the network device obtains the CG PUSCH and the HARQ-ACK and only receives data in the CG PUSCH resource scheduled to the user equipment through the DCI (i.e., assuming that there is no HARQ-ACK); if the CG PUSCH or the HARQ-ACK are not received, then there is a need to further receive data and HARQ-ACK in the DG PUSCH according to the determined HARQ-ACK bits. The network device may also judge whether the CG PUSCH exists by detecting the DMRS configured to the CG PUSCH, and if it is judged that the CG PUSCH exists, the network device receives data and HARQ-ACK in the CG PUSCH according to the determined HARQ-ACK bits; if it is judged that the CG PUSCH does not exist, the network device further receives data and HARQ-ACK in the DG PUSCH according to the determined HARQ-ACK bits.

In addition, if the network device schedules, through DCI, one DG PUSCH to be transmitted in the slot 2n+1 of SCC2, that is, there are multiple PUSCHs of the second type overlapping with the PUCCH at the same time, as shown in FIG. 8. In this case, the network device needs to set DAI values in DCI 1 and DCI 2 as the same value, for example, three, so as to avoid a case that the user equipment does not know which value is used to be referred to for determining the HARQ-ACK in the CG PUSCH in case that the DAI values are different. If the user equipment side loses one of the DG PUSCHs, for example, only one of DCI 1 or DCI 2 is received, a corresponding DAI value may also be obtained for determining the HARQ-ACK in the CG PUSCH.

Optionally, the HARQ-ACK transmission method further includes: setting an indication field of DAI in DCI scheduling the second type of PUSCH so as to indicate the number of downlink transmissions needing HARQ-ACKs to be transmitted in a PUSCH overlapping with the PUCCH in time domain, wherein when there are multiple PUSCHs of the second type, indication values of indication fields of DAIs in DCIs scheduling multiple PUSCHs of the second type are the same.

The network device may determine the number of bits of HARQ-ACK according to the number of downlink transmissions needing HARQ-ACK to be transmitted in the PUSCH overlapping with the PUCCH in time domain, for example, the network device indicates that four downlink transmissions need HARQ-ACK feedback, then, if it is assumed that each downlink transmission corresponds to 1-bit HARQ-ACK, then a total of 4-bit HARQ-ACK needs to be transmitted, wherein the number of HARQ-ACK bits corresponding to each downlink transmission can be predetermined according to relevant configuration of each downlink transmission.

Optionally, the obtaining the indication field of the Downlink Allocation Index (DAI) in the downlink control information (DCI) scheduling the second type of PUSCH includes: when the subcarrier spacing of the PUSCH is greater than the subcarrier spacing of the PUCCH, and/or when a plurality of PUSCHs overlap with the PUCCH in the time domain and the second type of PUSCH exists in the plurality of PUSCHs, obtaining the indication field of the DAI in the DCI scheduling the second type of PUSCH.

Third Embodiment

Figure 10:
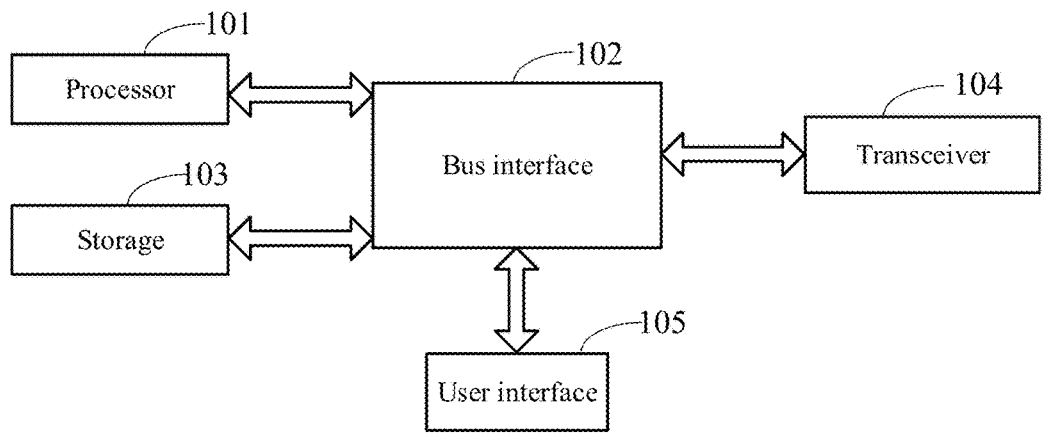
FIG. 10 shows a structural schematic diagram of a user equipment in a third embodiment of the present disclosure.

As shown in FIG. 10, this embodiment provides a user equipment. The user equipment includes: a processor 101, and a storage 103 connected to the processor 101 through a bus interface 102, the storage 103 is configured for storing programs and data used by the processor 101 when the processor 101 performs operations; wherein when the processor 101 calls and executes the programs and the data stored in the storage 103, the following processes are executed. A transceiver 104 is coupled to a bus interface 102 for receiving and transmitting data under the control of the processor 101.

In particular, the processor 101 implements the following steps when the processor 101 executes the computer program: when a Physical Uplink Control Channel (PUCCH) carrying HARQ-ACK overlaps with at least one Physical Uplink Shared Channel (PUSCH) in time domain, determining a target PUSCH for carrying the HARQ-ACK; when the target PUSCH is a first type of PUSCH, obtaining an indication field of a Downlink Allocation Index (DAI) in a Downlink Control Information (DCI) scheduling a second type of PUSCH; determining, according to the obtained indication field of the DAI, the number of bits of HARQ-ACK transmitted in the target PUSCH, and transmitting the HARQ-ACK in the target PUSCH according to the determined number of bits of the HARQ-ACK; wherein the first type of PUSCH is a PUSCH with a DCI scheduling, or a PUSCH scheduled by a DCI not including a DAI, the second type of PUSCH is a PUSCH scheduled by a DCI with a DAI, the first type of PUSCH and the second type of PUSCH are overlapped with the same PUCCH in time domain.

Optionally, the first type of PUSCH and/or the second type of PUSCH are PUSCHs transmitted in a time duration corresponding to a slot in which the PUCCH is transmitted.

Optionally, the processor 101 implements at least one of following cases when the processor 101 executes the computer program: when the same subcarrier spacing is used for the PUCCH and the PUSCH, the PUSCH is transmitted in a slot n, if the PUCCH is transmitted in the slot n; when the subcarrier spacing of the PUCCH is larger than the subcarrier spacing of the PUSCH, if the PUCCH is transmitted in at least one slot of a slot s*n to a slot s*n+s−1, then the PUSCH is transmitted in a slot n, wherein s represents a multiple obtained by dividing a subcarrier spacing of the PUCCH by a subcarrier spacing of the PUSCH; when the subcarrier spacing of the PUCCH is smaller than the subcarrier spacing of the PUSCH, if the PUCCH is transmitted in a slot n, then the PUSCH is transmitted in at least one slot of a slot k*n to a slot k*n+k−1, where k represents a multiple obtained by dividing the subcarrier spacing of the PUSCH by the subcarrier spacing of the PUCCH; where n is an integer.

Optionally, the second type of PUSCH and the first type of PUSCH are located on the same carrier or on different carriers.

Optionally, the second type of PUSCH and the first type of PUSCH are located in the same slot or in different slots.

Optionally, when there are a plurality of PUSCHs of the second type, indication values in indication fields of DAI in the DCIs scheduling the plurality of PUSCHs of the second type are the same.

Optionally, the processor 101 implements following steps when the processor 101 executes the computer program: when the subcarrier spacing of the PUSCH is greater than the subcarrier spacing of the PUCCH, and/or when a plurality of PUSCHs overlap with the PUCCH in the time domain and the second type of PUSCH exists in the plurality of PUSCHs, obtaining the indication field of the DAI in the DCI scheduling the second type of PUSCH.

It should be noted that in FIG. 10, a bus architecture may include any number of interconnected buses and bridges. Specifically, various circuits such as one or more processors represented by the processor 101 and a storage represented by the storage 103 are linked together. The bus architecture may also link together various other circuits, such as peripherals, voltage regulators, and power management circuits, all of which are well known in the art and thus will not be described further herein. The bus interface provides an interface. The transceiver 104 may be a plurality of elements, i.e., including a transmitter and a receiving, for providing means for communicating with various other devices over a transmission medium. For different user devices, a user interface 105 may also be an interface capable of externally interfacing a desired device, connected devices includes, but is not limited to, a keypad, a display, a speaker, a microphone, a joystick, and the like. The processor 101 is responsible for managing the bus architecture and general processing, and the storage 103 may store data used by the processor 101 when the processor 101 performs operations.

Those skilled in the art will appreciate that all or part of the steps for implementing the above-described embodiments may be performed by hardware, or may be performed by a computer program indicating a relevant hardware, the computer program includes instructions for performing some or all of the steps of the above method; and the computer program may be stored in a readable storage medium which may be any form of storage medium.

Fourth Embodiment

Figure 11:
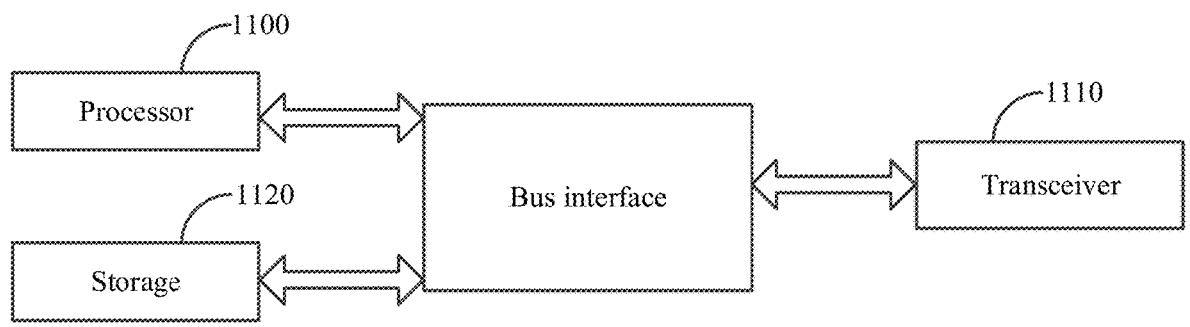
FIG. 11 shows a structural schematic diagram of a network device in a fourth embodiment of the present disclosure.

In order to better achieve the above objective, as shown in FIG. 11, the embodiment of the present disclosure also provides a network device, the network device includes a processor 1100, a storage 1120 connected to the processor 1100 through a bus interface, and a transceiver 1110 connected to the processor 1100 through the bus interface, the storage 1120 is configured for storing programs and data used by the processor when the processor performs operations, transmitting data information or a pilot through the transceiver 1110 and also receiving an uplink control channel through the transceiver 1110; when the processor 1100 calls and executes the programs and the data stored in the storage 1120, the following functions are realized by the processor: when a Physical Uplink Control Channel (PUCCH) carrying HARQ-ACK overlaps with at least one Physical Uplink Shared Channel (PUSCH) in time domain, determining a target PUSCH for carrying the HARQ-ACK; when the target PUSCH is a first type of PUSCH, obtaining an indication field of a Downlink Allocation Index (DAI) in a Downlink Control Information (DCI) for scheduling a second type of PUSCH; determining, according to the obtained indication field of the DAI, the number of bits of HARQ-ACK transmitted in the target PUSCH, and receiving the HARQ-ACK in the target PUSCH according to the determined number of bits of the HARQ-ACK; wherein the first type of PUSCH is a PUSCH with a DCI scheduling, or a PUSCH scheduled by a DCI not including a DAI, the second type of PUSCH is a PUSCH scheduled by a DCI with a DAI, the first type of PUSCH and the second type of PUSCH are overlapped with the same PUCCH in time domain.

Optionally, the first type of PUSCH and/or the second type of PUSCH are PUSCHs transmitted in a time duration corresponding to a slot in which the PUCCH is transmitted.

Optionally, the processor 1100 implements at least one of following cases when the processor 1100 executes the computer program: when the same subcarrier spacing is used for the PUCCH and the PUSCH, the PUSCH is transmitted in a slot n, if the PUCCH is transmitted in the slot n; when the subcarrier spacing of the PUCCH is larger than the subcarrier spacing of the PUSCH, if the PUCCH is transmitted in at least one slot of a slot s*n to a slot s*n+s−1, then the PUSCH is transmitted in a slot n, wherein s represents a multiple obtained by dividing a subcarrier spacing of the PUCCH by a subcarrier spacing of the PUSCH; when the subcarrier spacing of the PUCCH is smaller than the subcarrier spacing of the PUSCH, if the PUCCH is transmitted in a slot n, then the PUSCH is transmitted in at least one slot of a slot k*n to a slot k*n+k−1, where k represents a multiple obtained by dividing the subcarrier spacing of the PUSCH by the subcarrier spacing of the PUCCH; where n is an integer.

Optionally, the second type of PUSCH and the first type of PUSCH are located on the same carrier or on different carriers.

Optionally, the second type of PUSCH and the first type of PUSCH are located in the same slot or in different slots.

Optionally, the processor 1100 implements following steps when the processor 1100 executes the computer program: setting an indication field of DAI in DCI scheduling the second type of PUSCH so as to indicate the number of downlink transmissions needing HARQ-ACKs to be transmitted in a PUSCH overlapping with the PUCCH in time domain, wherein when there are multiple PUSCHs of the second type, indication values of indication fields of DAIs in DCIs scheduling multiple PUSCHs of the second type are the same.

Optionally, Optionally, the processor 1100 implements following steps when the processor 1100 executes the computer program: when the subcarrier spacing of the PUSCH is greater than the subcarrier spacing of the PUCCH, and/or when a plurality of PUSCHs overlap with the PUCCH in the time domain and the second type of PUSCH exists in the plurality of PUSCHs, obtaining the indication field of the DAI in the DCI scheduling the second type of PUSCH.

In FIG. 11, a bus architecture may include any number of interconnected buses and bridges. Specifically, various circuits such as one or more processors represented by the processor 1100 and a storage represented by the storage 1120 are linked together. The bus architecture may also link together various other circuits, such as peripherals, voltage regulators, and power management circuits, all of which are well known in the art and thus will not be described further herein. The bus interface provides an interface. The transceiver 1110 may be a plurality of elements, i.e., including a transmitter and a receiving, for providing means for communicating with various other devices over a transmission medium. The processor 1100 is responsible for managing the bus architecture and general processing, and the storage 1120 may store data used by the processor 1100 when the processor 1100 performs operations.

Those skilled in the art will appreciate that all or part of the steps for implementing the above-described embodiments may be performed by hardware, or may be performed by a computer program indicating a relevant hardware, the computer program includes instructions for performing some or all of the steps of the above method; and the computer program may be stored in a readable storage medium which may be any form of storage medium.

Fifth Embodiment

Figure 12:
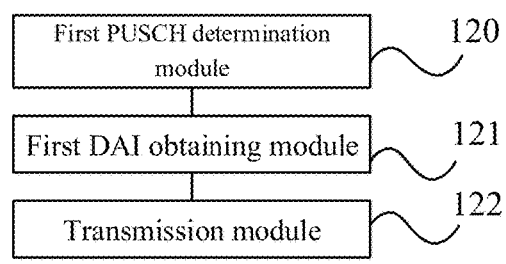
FIG. 12 shows a block diagram of a user equipment in a fifth embodiment of the present disclosure.

An embodiment of the present disclosure also provides a user equipment, as shown in FIG. 12, the user equipment includes: a first PUSCH determination module 120 configured for, when a Physical Uplink Control Channel (PUCCH) carrying HARQ-ACK overlaps with a Physical Uplink Shared Channel (PUSCH) in time domain, determining a target PUSCH for carrying the HARQ-ACK; a first DAI obtaining module 121 configured for, when the target PUSCH is a first type of PUSCH, obtaining an indication field of a Downlink Allocation Index (DAI) in a Downlink Control Information (DCI) scheduling a second type of PUSCH; and a transmission module 122 configured for determining, according to the obtained indication field of the DAI, the number of bits of HARQ-ACK transmitted in the target PUSCH, and transmitting the HARQ-ACK in the target PUSCH according to the determined number of bits of the HARQ-ACK; wherein, the first type of PUSCH is a PUSCH with a DCI scheduling, or a PUSCH scheduled by a DCI not including a DAI, the second type of PUSCH is a PUSCH scheduled by a DCI with a DAI, the first type of PUSCH and the second type of PUSCH are overlapped with the same PUCCH in time domain.

Optionally, the first type of PUSCH and/or the second type of PUSCH are PUSCHs transmitted in a time duration corresponding to a slot in which the PUCCH is transmitted.

Optionally, the user equipment implements at least one of the following cases: when the same subcarrier spacing is used for the PUCCH and the PUSCH, the PUSCH is transmitted in a slot n, if the PUCCH is transmitted in the slot n; when the subcarrier spacing of the PUCCH is larger than the subcarrier spacing of the PUSCH, if the PUCCH is transmitted in at least one slot of a slot s*n to a slot s*n+s−1, then the PUSCH is transmitted in a slot n, wherein s represents a multiple obtained by dividing a subcarrier spacing of the PUCCH by a subcarrier spacing of the PUSCH; when the subcarrier spacing of the PUCCH is smaller than the subcarrier spacing of the PUSCH, if the PUCCH is transmitted in a slot n, then the PUSCH is transmitted in at least one slot of a slot k*n to a slot k*n+k−1, where k represents a multiple obtained by dividing the subcarrier spacing of the PUSCH by the subcarrier spacing of the PUCCH; where n is an integer.

Optionally, the second type of PUSCH and the first type of PUSCH are located on the same carrier or on different carriers.

Optionally, the second type of PUSCH and the first type of PUSCH are located in the same slot or in different slots.

Optionally, when there are a plurality of PUSCHs of the second type, indication values in indication fields of DAI in the DCIs scheduling the plurality of PUSCHs of the second type are the same.

Optionally, the first DAI obtaining module 121 is specifically configured for: when the subcarrier spacing of the PUSCH is greater than the subcarrier spacing of the PUCCH, and/or when a plurality of PUSCHs overlap with the PUCCH in the time domain and the second type of PUSCH exists in the plurality of PUSCHs, obtaining the indication field of the DAI in the DCI scheduling the second type of PUSCH.

Sixth Embodiment

Figure 13:
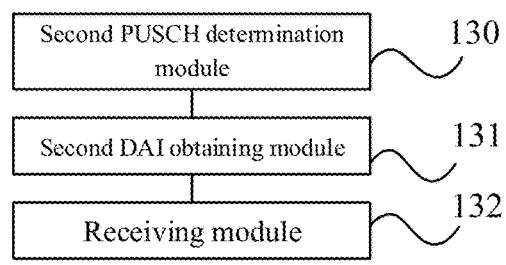
FIG. 13 shows a block diagram of a network device in a sixth embodiment of the present disclosure.

The embodiment of the present disclosure also provides a network device, as shown in FIG. 13, the network device includes: a second PUSCH determination module 130 configured for, when a Physical Uplink Control Channel (PUCCH) carrying HARQ-ACK overlaps with a Physical Uplink Shared Channel (PUSCH) in time domain, determining a target PUSCH for carrying the HARQ-ACK; a second DAI obtaining module 131 configured for, when the target PUSCH is a first type of PUSCH, obtaining an indication field of a Downlink Allocation Index (DAI) in a Downlink Control Information (DCI) for scheduling a second type of PUSCH; a receiving module 132 configured for, determining, according to the obtained indication field of the DAI, the number of bits of HARQ-ACK transmitted in the target PUSCH, and receiving the HARQ-ACK in the target PUSCH according to the determined number of bits of the HARQ-ACK; wherein the first type of PUSCH is a PUSCH with a DCI scheduling, or a PUSCH scheduled by a DCI not including a DAI, the second type of PUSCH is a PUSCH scheduled by a DCI with a DAI, the first type of PUSCH and the second type of PUSCH are overlapped with the same PUCCH in time domain.

Optionally, the first type of PUSCH and/or the second type of PUSCH are PUSCHs transmitted in a time duration corresponding to a slot in which the PUCCH is transmitted.

Optionally, the network device implements at least one of the following cases: when the same subcarrier spacing is used for the PUCCH and the PUSCH, the PUSCH is transmitted in a slot n, if the PUCCH is transmitted in the slot n; when the subcarrier spacing of the PUCCH is larger than the subcarrier spacing of the PUSCH, if the PUCCH is transmitted in at least one slot of a slot s*n to a slot s*n+s−1, then the PUSCH is transmitted in a slot n, wherein s represents a multiple obtained by dividing a subcarrier spacing of the PUCCH by a subcarrier spacing of the PUSCH; when the subcarrier spacing of the PUCCH is smaller than the subcarrier spacing of the PUSCH, if the PUCCH is transmitted in a slot n, then the PUSCH is transmitted in at least one slot of a slot k*n to a slot k*n+k−1, where k represents a multiple obtained by dividing the subcarrier spacing of the PUSCH by the subcarrier spacing of the PUCCH; where n is an integer.

Optionally, the second type of PUSCH and the first type of PUSCH are located on the same carrier or on different carriers.

Optionally, the second type of PUSCH and the first type of PUSCH are located in the same slot or in different slots.

Optionally, the network device further includes a setting module configured for, setting an indication field of DAI in DCI scheduling the second type of PUSCH so as to indicate the number of downlink transmissions needing HARQ-ACKs to be transmitted in a PUSCH overlapping with the PUCCH in time domain, wherein when there are multiple PUSCHs of the second type, indication values of indication fields of DAIs in DCIs scheduling multiple PUSCHs of the second type are the same Optionally, the second DAI obtaining module 131 is specifically configured for: when the subcarrier spacing of the PUSCH is greater than the subcarrier spacing of the PUCCH, and/or when a plurality of PUSCHs overlap with the PUCCH in the time domain and the second type of PUSCH exists in the plurality of PUSCHs, obtaining the indication field of the DAI in the DCI scheduling the second type of PUSCH.

An embodiment of the present disclosure also provides a computer-readable storage medium having stored thereon a computer program. When the computer program is executed by a processor, each step of the Hybrid Automatic Repeat reQuest (HARQ)-Acknowledge (ACK) transmission method in the above embodiments is implemented, and the same technical effect can be achieved, which is not repeated herein to avoid duplication. The computer readable storage medium is such as a Read-Only Memory (ROM), a Random Access Memory (RAM), a magnetic disk or optical disk, etc.

In addition, it should be noted that in the devices and the methods of the present disclosure, it is apparent that components or steps may be disassembled and/or recombined. Such disassembling and/or recombination should be considered as equivalent solutions of the present disclosure. The steps of executing the above-described series of processes may naturally be executed in a chronological order in the described order, but are not necessary to be executed in the chronological order, and some steps may be executed in parallel or independently of each other. It may be understood by those skilled in the art that all or any of the steps or the components of the methods and the devices of the present disclosure may be implemented by hardware, firmware, software, or combinations thereof in any computing device (including processors, storage media, etc.) or a network of computing devices, which can be accomplished by those of ordinary skills in the art using their basic programming skills after reading description of the present disclosure.

Accordingly, the objective of the present disclosure may also be achieved by running a program or a set of programs on any computing device. The computing device may be a well-known general-purpose device. Accordingly, the objective of the present disclosure may also be achieved by merely providing a program product containing a program code used to implement the methods or the devices. That is, such a program product also constitutes the present disclosure, and a storage medium storing such a program product also constitutes the present disclosure. Obviously, the storage medium may be any known storage medium or any storage medium to be developed in the future. It should also be noted that in the devices and the methods of the present disclosure, it will be apparent that the components or the steps may be disassembled and/or recombined. Such disassembling and/or recombination should be considered as equivalent solutions of the present disclosure. The steps of executing the above-described series of processes may naturally be executed in a chronological order in the described order, but are not necessary to be executed in the chronological order, and some steps may be executed in parallel or independently of each other.

It will be appreciated that the embodiments described in the present disclosure may be implemented by hardware, software, firmware, middleware, microcode, or combinations thereof. For implementation by hardware, units, modules, sub-units and sub-modules may be implemented in one or more Application Specific Integrated Circuits (ASIC), Digital Signal Processing (DSP) devices, DSP devices (DSPD), Programmable Logic Devices (PLD), Field-Programmable Gate Array (FPGA), general-purpose processors, controllers, microcontrollers, microprocessors, other electronic units for performing the functions described in the present disclosure, or combinations thereof.

For implementation by software, techniques described in embodiments of the present disclosure may be implemented by modules (e.g., processes, functions, etc.) that perform the functions described in embodiments of the present disclosure. The software codes may be stored in a memory and executed by a processor. The memory may be implemented in the processor or external to the processor.

The foregoing provides optional embodiments of the present disclosure, and it should be noted that several modifications and embellishments may be made by those of ordinary skill in the art without departing from the principles set forth in the present disclosure, these modifications and embellishments should also be considered to be within the protection scope of the present disclosure.

What is claimed is:

1. A Hybrid Automatic Repeat reQuest (HARD)-Acknowledge (ACK) transmission method, performed by a user equipment, comprising:
   determining a target Physical Uplink Shared Channel (PUSCH) for carrying the HARQ-ACK, when a Physical Uplink Control Channel (PUCCH) carrying the HARQ-ACK overlaps with at least one PUSCH in time domain;
   obtaining an indication field of a Downlink Allocation Index (DAI) in a Downlink Control Information (DCI) scheduling a second type of PUSCH, when the target PUSCH is a first type of PUSCH;
   determining, according to the obtained indication field of the DAI, the number of bits of the HARQ-ACK transmitted in the target PUSCH, and transmitting the HARQ-ACK in the target PUSCH according to the determined number of bits of the HARQ-ACK,
   wherein the first type of PUSCH is a PUSCH without a DCI scheduling or a PUSCH scheduled by a DCI without DAI, the second type of PUSCH is a PUSCH scheduled by a DCI with a DAI, the first type of PUSCH and the second type of PUSCH are overlapped with the same PUCCH in time domain.

2. The HARQ-ACK transmission method according to claim 1, wherein the first type of PUSCH and/or the second type of PUSCH are PUSCHs transmitted in a time duration corresponding to a slot in which the PUCCH is transmitted.

3. The HARQ-ACK transmission method according to claim 2, comprising at least one of following:
   the PUSCH and the PUCCH are transmitted in a slot n, when the same subcarrier spacing is used for the PUCCH and the PUSCH;
   the PUSCH is transmitted in a slot n and the PUCCH is transmitted in at least one slot in a set including slots from a slot s*n to a slot s*n+s−1, when a subcarrier spacing of the PUCCH is larger than a subcarrier spacing of the PUSCH, wherein s represents a multiple obtained by dividing the subcarrier spacing of the PUCCH by the subcarrier spacing of the PUSCH; or
   the PUSCH is transmitted in at least one slot in a set including slots from a slot k*n to a slot k*n+k−1 and the PUCCH is transmitted in a slot n, when a subcarrier spacing of the PUCCH is smaller than a subcarrier spacing of the PUSCH, wherein k represents a multiple obtained by dividing the subcarrier spacing of the PUSCH by the subcarrier spacing of the PUCCH;
   wherein n is an integer.

4. The HARQ-ACK transmission method according to claim 1, wherein the second type of PUSCH and the first type of PUSCH are on the same carrier or on different carriers;
   and/or,
   the second type of PUSCH and the first type of PUSCH are in the same slot or in different slots;
   and/or,
   when there are a plurality of PUSCHs of the second type, indication values in indication fields of DAI in DCIs scheduling the plurality of PUSCHs of the second type are the same.

5. The HARQ-ACK transmission method according to claim 1, wherein obtaining the indication field of the DAI in the DCI scheduling the second type of PUSCH comprises:
   obtaining the indication field of the DAI in the DCI scheduling the second type of PUSCH, when the subcarrier spacing of the PUSCH is larger than the subcarrier spacing of the PUCCH, and/or when a plurality of PUSCHs overlap with the PUCCH in time domain and the second type of PUSCH exists in the plurality of PUSCHs.

6. A Hybrid Automatic Repeat reQuest (HARD)-Acknowledge (ACK) transmission method, performed by a network device, comprising:
    determining a target Physical Uplink Shared Channel (PUSCH) for carrying the HARQ-ACK, when a Physical Uplink Control Channel (PUCCH) carrying the HARQ-ACK overlaps with at least one PUSCH in time domain;
    obtaining an indication field of a Downlink Allocation Index (DAI) in a Downlink Control Information (DCI) scheduling a second type of PUSCH, when the target PUSCH is a first type of PUSCH;
    determining, according to the obtained indication field of the DAI, the number of bits of the HARQ-ACK transmitted in the target PUSCH, and receiving the HARQ-ACK in the target PUSCH according to the determined number of bits of the HARQ-ACK,
    wherein the first type of PUSCH is a PUSCH with a DCI scheduling or a PUSCH scheduled by a DCI without DAI, the second type of PUSCH is a PUSCH scheduled by a DCI with a DAI, the first type of PUSCH and the second type of PUSCH are overlapped with the same PUCCH in time domain.

7. The HARQ-ACK transmission method according to claim 6, wherein the first type of PUSCH and/or the second type of PUSCH are PUSCHs transmitted in a time duration corresponding to a slot in which the PUCCH is transmitted.

8. The HARQ-ACK transmission method according to claim 7, comprising at least one of following:
    the PUSCH and the PUCCH are transmitted in a slot n, when the same subcarrier spacing is used for the PUCCH and the PUSCH;
    the PUSCH is transmitted in a slot n and the PUCCH is transmitted in at least one slot in a set including slots from a slot s*n to a slot s*n+s−1, when a subcarrier spacing of the PUCCH is larger than a subcarrier spacing of the PUSCH, wherein s represents a multiple obtained by dividing the subcarrier spacing of the PUCCH by the subcarrier spacing of the PUSCH; or
    the PUSCH is transmitted in at least one slot in a set including slots from a slot k*n to a slot k*n+k−1 and the PUCCH is transmitted in a slot n, when a subcarrier spacing of the PUCCH is smaller than a subcarrier spacing of the PUSCH, wherein k represents a multiple obtained by dividing the subcarrier spacing of the PUSCH by the subcarrier spacing of the PUCCH;
    wherein n is an integer.

9. The HARQ-ACK transmission method according to claim 6, wherein the second type of PUSCH and the first type of PUSCH are located on the same carrier or on different carriers;
    and/or,
    the second type of PUSCH and the first type of PUSCH are located in the same slot or in different slots;
    and/or,
    the HARQ-ACK transmission method further comprises:
        setting an indication field of a DAI in a DCI scheduling the second type of PUSCH, for indicating the number of downlink transmissions needing HARQ-ACKs to be transmitted in a PUSCH overlapping with the PUCCH in time domain;
        when there are multiple PUSCHs of the second type, indication values of indication fields of DAIs in DCIs scheduling multiple PUSCHs of the second type are the same.

10. The HARQ-ACK transmission method according to claim 6, wherein obtaining the indication field of the DAI in the DCI scheduling the second type of PUSCH comprises:
    obtaining the indication field of the DAI in the DCI scheduling the second type of PUSCH, when the subcarrier spacing of the PUSCH is larger than the subcarrier spacing of the PUCCH, and/or when a plurality of PUSCHs overlap with the PUCCH in time domain and the second type of PUSCH exists in the plurality of PUSCHs.

11. A network device, comprising a transceiver, a storage, a processor, and a computer program stored on the storage and executable by the processor, wherein, when the processor executes the computer program, the processor implements steps of the HARQ-ACK transmission method according to claim 6.

12. The network device according to claim 11, wherein the first type of PUSCH and/or the second type of PUSCH are PUSCHs transmitted in a time duration corresponding to a slot in which the PUCCH is transmitted.

13. The network device according to claim 12, wherein when the processor executes the computer program, the processor implements at least one of following:
    the PUSCH and the PUCCH are transmitted in a slot n, when the same subcarrier spacing is used for the PUCCH and the PUSCH;
    the PUSCH is transmitted in a slot n and the PUCCH is transmitted in at least one slot in a set including slots from a slot s*n to a slot s*n+s−1, when a subcarrier spacing of the PUCCH is larger than a subcarrier spacing of the PUSCH, wherein s represents a multiple obtained by dividing the subcarrier spacing of the PUCCH by the subcarrier spacing of the PUSCH; or
    the PUSCH is transmitted in at least one slot of in a set including slots from a slot k*n to a slot k*n+k−1 and the PUCCH is transmitted in a slot n, when a subcarrier spacing of the PUCCH is smaller than a subcarrier spacing of the PUSCH, wherein k represents a multiple obtained by dividing the subcarrier spacing of the PUSCH by the subcarrier spacing of the PUCCH;
    wherein n is an integer.

14. The network device according to claim 11, wherein the second type of PUSCH and the first type of PUSCH are located on the same carrier or on different carriers;
    and/or,
    the second type of PUSCH and the first type of PUSCH are located in the same slot or in different slots;
    and/or,
    when the processor executes the computer program, the processor further implements a following step:
        setting an indication field of a DAI in a DCI scheduling the second type of PUSCH, for indicating the number of downlink transmissions needing HARQ-ACKs to be transmitted in a PUSCH overlapping with the PUCCH in time domain, wherein when there are multiple PUSCHs of the second type, indication values of indication fields of DAIs in DCIs scheduling multiple PUSCHs of the second type are the same.

15. The network device according to claim 11, wherein when the processor executes the computer program, the processor further implements a following step:
    obtaining the indication field of the DAI in the DCI scheduling the second type of PUSCH, when the subcarrier spacing of the PUSCH is larger than the subcarrier spacing of the PUCCH, and/or when a plurality of PUSCHs overlap with the PUCCH in time domain and the second type of PUSCH exists in the plurality of PUSCHs.

16. A user equipment, comprising a transceiver, a storage, a processor and a computer program stored on the storage and executable on the processor, wherein, when the processor executes the computer program, the processor implements following steps:

determining a target Physical Uplink Shared Channel (PUSCH) for carrying a Hybrid Automatic Repeat reQuest (HARD)-Acknowledge (ACK), when a Physical Uplink Control Channel (PUCCH) carrying the HARQ-ACK overlaps with at least one PUSCH in time domain;

obtaining an indication field of a Downlink Allocation Index (DAI) in a Downlink Control Information (DCI) scheduling a second type of PUSCH, when the target PUSCH is a first type of PUSCH;

determining, according to the obtained indication field of the DAI, the number of bits of the HARQ-ACK transmitted in the target PUSCH, and transmitting the HARQ-ACK in the target PUSCH according to the determined number of bits of the HARQ-ACK, wherein the first type of PUSCH is a PUSCH with a DCI scheduling or a PUSCH scheduled by a DCI without DAI, the second type of PUSCH is a PUSCH scheduled by a DCI with a DAI, the first type of PUSCH and the second type of PUSCH are overlapped with the same PUCCH in time domain.

17. The user equipment according to claim 16, wherein the first type of PUSCH and/or the second type of PUSCH are PUSCHs transmitted in a time duration corresponding to a slot in which the PUCCH is transmitted.

18. The user equipment according to claim 17, wherein when the processor executes the computer program, the processor implements at least one of following:

the PUSCH and the PUCCH are transmitted in a slot n, when the same subcarrier spacing is used for the PUCCH and the PUSCH;

the PUSCH is transmitted in a slot n and the PUCCH is transmitted in at least one slot in a set including slots from a slot s*n to a slot s*n+s−1, when a subcarrier spacing of the PUCCH is larger than a subcarrier spacing of the PUSCH, wherein s represents a multiple obtained by dividing the subcarrier spacing of the PUCCH by the subcarrier spacing of the PUSCH; or the PUSCH is transmitted in at least one slot in a set including slots from a slot k*n to a slot k*n+k−1 and the PUCCH is transmitted in a slot n, when a subcarrier spacing of the PUCCH is smaller than a subcarrier spacing of the PUSCH, wherein k represents a multiple obtained by dividing the subcarrier spacing of the PUSCH by the subcarrier spacing of the PUCCH;

wherein n is an integer.

19. The user equipment according to claim 16, wherein the second type of PUSCH and the first type of PUSCH are located on the same carrier or on different carriers;

and/or, the second type of PUSCH and the first type of PUSCH are located in the same slot or in different slots;

and/or, when there are a plurality of PUSCHs of the second type, indication values in indication fields of DAI in DCIs scheduling the plurality of PUSCHs of the second type are the same.

20. The user equipment according to claim 16, wherein when the processor executes the computer program, the processor further implements following steps:

obtaining the indication field of the DAI in the DCI scheduling the second type of PUSCH, when the subcarrier spacing of the PUSCH is larger than the subcarrier spacing of the PUCCH, and/or when a plurality of PUSCHs overlap with the PUCCH in time domain and the second type of PUSCH exists in the plurality of PUSCHs.

* * * * *